(12) United States Patent
Ogata et al.

(10) Patent No.: US 11,274,974 B2
(45) Date of Patent: Mar. 15, 2022

(54) TEMPERATURE SENSOR

(71) Applicant: DENSO CORPORATION, Kariya (JP)

(72) Inventors: Itsuhei Ogata, Nisshin (JP); Mitsuhiro Konno, Nisshin (JP); Chiaki Ogawa, Kariya (JP); Yasuhiro Oya, Kariya (JP)

(73) Assignee: DENSO CORPORATION, Kariya (JP)

( * ) Notice: Subject to any disclaimer, the term of this patent is extended or adjusted under 35 U.S.C. 154(b) by 224 days.

(21) Appl. No.: 16/381,043

(22) Filed: Apr. 11, 2019

(65) Prior Publication Data
US 2019/0316974 A1  Oct. 17, 2019

(30) Foreign Application Priority Data

Apr. 12, 2018  (JP) .............................. JP2018-077130

(51) Int. Cl.
*G01K 7/22* (2006.01)
*G01K 13/02* (2021.01)
*G01K 13/00* (2021.01)
*G01K 13/024* (2021.01)

(52) U.S. Cl.
CPC ............... *G01K 7/22* (2013.01); *G01K 13/00* (2013.01); *G01K 13/02* (2013.01); *G01K 13/024* (2021.01)

(58) Field of Classification Search
None
See application file for complete search history.

(56) References Cited

U.S. PATENT DOCUMENTS

| | | | |
|---|---|---|---|
| 2009/0279586 A1* | 11/2009 | Suzuki | G01K 13/02 374/185 |
| 2010/0152731 A1* | 6/2010 | de la Rama | A61M 25/0074 606/41 |
| 2012/0063488 A1* | 3/2012 | Nakayama | G01K 7/24 374/185 |
| 2012/0147923 A1* | 6/2012 | Schmidt | G01K 13/02 374/158 |
| 2014/0266567 A1 | 9/2014 | Watanabe et al. | |
| 2015/0308903 A1* | 10/2015 | Sohn | H01C 7/042 374/185 |
| 2015/0316422 A1 | 11/2015 | Oya et al. | |

FOREIGN PATENT DOCUMENTS

| | | |
|---|---|---|
| JP | 2011-124446 | 6/2011 |
| JP | 2012-052959 | 3/2012 |
| JP | 2016-012697 | 1/2016 |

\* cited by examiner

*Primary Examiner* — Erica S Lin
(74) *Attorney, Agent, or Firm* — Nixon & Vanderhye P.C.

(57) ABSTRACT

A temperature sensor includes a metal tube having an opening tip portion, a temperature sensing element for measuring a temperature, a pair of lead wires contacting with a surface of the temperature sensing element, an insulating support material for insulating the pair of lead wires from the metal tube, and a coating material for covering the temperature sensing element, lead tip portions of the pair of lead wires, and a tip surface of the insulating support material at the opening tip portion of the metal tube. The coating material has a property of not allowing measurement target gas to pass through and contains oxide and at least one of platinum, platinum alloy, and platinum-containing oxide that are dispersed in the oxide.

12 Claims, 9 Drawing Sheets

TEMPERATURE SENSOR

CROSS-REFERENCE TO RELATED APPLICATION

This application is based on and claims the benefit of priority from earlier Japanese Patent Application No. 2018-77130 filed Apr. 12, 2018, the description of which is incorporated herein by reference.

BACKGROUND

Technical Field

The present disclosure relates to a temperature sensor using a temperature sensing element for measuring a temperature.

Description of the Related Art

The temperature sensor is disposed, for example, in an exhaust pipe of an automobile and used for measuring the temperature of exhaust gas flowing through the exhaust pipe. For example, Japanese Patent Application Publication No. 2012-52959 discloses a temperature sensor in which a temperature sensing element is connected to metal core wires inserted in a metal sheath (metal tube). The temperature sensing element is disposed in a metallic cover attached to the tip of the metal sheath. The temperature sensing element is fixed to the metal sheath by a filler (insulating material) filled in the metal sheath.

The temperature sensor is required to have responsiveness to promptly detect a change in a temperature of measurement target gas such as exhaust gas. In order to improve the responsiveness, it is conceivable to improve heat conductivity between measurement target gas in measurement environment and a temperature sensing element such as a thermistor. However, in such a conventional temperature sensor, a temperature sensing element is covered with a metallic cover via a filler. Since the metallic cover functions as a heat insulating material, heat is difficult to transfer between measurement target gas in the measurement environment and the temperature sensing element. As a result, the temperature of the temperature sensing element is difficult to change, and a certain time is required until the temperature of the temperature sensing element reaches the temperature of the measurement target gas, and therefore, the responsiveness of the temperature sensor is hindered.

In order to improve the responsiveness of the temperature sensor, a metallic cover of a temperature sensor such as the temperature sensor in the above application could conceivably be eliminated. However, in this case, unless the temperature sensing element is appropriately protected, the temperature sensing element may be exposed to the measurement target gas and be deteriorated by gas such as reducing gas contained in the measurement target gas. Therefore, the durability of the temperature sensor against the measurement target gas cannot be secured unless a special measure is taken with the temperature sensor in order to eliminate the metallic cover.

SUMMARY

The present disclosure, which has been made in view of the above problems, is directed to providing a temperature sensor capable of improving responsiveness and maintaining high durability.

In accordance with an aspect of the present disclosure, there is provided a temperature sensor that includes a metal tube having an opening as an opening tip portion at a tip of the metal tube, a temperature sensing element disposed at the opening tip portion for measuring a temperature of measurement target gas in measurement environment, a pair of lead wires disposed in the metal tube, each including a lead tip portion containing at least one of platinum and platinum alloy and contacting with a surface of the temperature sensing element, an insulating support material disposed in the metal tube and made of ceramic for insulating the pair of lead wires from the metal tube and supporting the pair of lead wires in the metal tube, a coating material disposed at the opening tip portion in a state of covering the temperature sensing element, the lead tip portion, and a tip surface of the insulating support material and having a property of not allowing measurement target gas to pass through. The coating material contains an oxide and at least one kind of platinum, platinum alloy, and platinum-containing oxide containing platinum that are dispersed in the oxide.

In the temperature sensor of the one aspect, the metal tube has the opening as the opening tip portion at the tip of the metal tube. The temperature sensing element disposed at the opening tip portion is covered with the coating material. No metallic cover (curved-surface-shaped tip part) for covering the temperature sensing element is provided at the opening tip portion of the metal tube. With the configuration, heat transfer such as heat radiation and heat transmission (heat convection) can easily occur between a tip portion of the temperature sensor and measurement target gas in measurement environment. As a result, the time until the temperature of the temperature sensing element reaches the temperature of the measurement target gas can be shortened, so that the responsiveness of the temperature sensor can improve.

The coating material is disposed on the opening tip portion of the metal tube in a state of covering the temperature sensing element, each lead tip portion of the pair of lead wires, and the tip surface of the insulating support material. The coating material contains the oxide and the at least one kind of platinum, platinum alloy, and platinum-containing oxide that are dispersed in the oxide. Each lead tip portion of the pair of lead wires contains the at least one of platinum and platinum alloy. The platinum-containing oxide is referred to as a mixture of platinum and oxide. The platinum-containing oxide may contain metal other than platinum.

The above configuration can prevent the coating material from being separated from the lead tip portions in a state in which the coating material is in contact with the lead tip portions of the pair of lead wires. As a result, in the case in which measurement target gas tries to intrude into the temperature sensing element along an interface between the coating material and the tip surface of the insulating support material, the measurement target gas is difficult to intrude into the interface between the coating material and each lead tip portion. The coating material has a property of not allowing measurement target gas to pass through.

The interface between the coating material and each lead tip portion closely adheres, which can maintain the adhesiveness of the interface between the coating material and the temperature sensing element and can prevent the coating material from being separated from the temperature sensing element. Thus, the measurement target gas is difficult to contact with the temperature sensing element. As a result, the temperature sensing element can be prevented from being deteriorated by being exposed to the measurement target gas, and the durability (reliability) of the temperature sensor against the measurement target gas can be kept high.

Thus, the temperature sensor according to the one aspect can improve responsiveness of the temperature sensor and maintain high durability (reliability) of the temperature sensor.

The configuration in which the temperature sensing element is disposed at the opening tip portion of the metal tube indicates that the temperature sensing element only needs to be present at the periphery of the opening tip portion. For example, a part of the temperature sensing element may be disposed on the tip side relative to the opening tip portion of the metal tube, and a remaining part of the temperature sensing element other than the part may be disposed on the base end side relative to the opening tip portion. The entire temperature sensing element may be disposed on the tip side relative to the opening tip portion.

Each lead wire may be constituted of a first wire portion supported by the insulating support material and a second wire portion serving as the lead tip portion and protruding from the insulating support material, which are joined by welding. In the case, the first wire portion and the second wire portion may be made of different metal kinds of materials. The entire lead wires may contain at least one of platinum and platinum alloy.

DETAILED DESCRIPTION OF THE PREFERRED EMBODIMENTS

Preferred embodiments of the above-described temperature sensor will be described with reference to the drawings.
(Embodiments)

Figure 1:
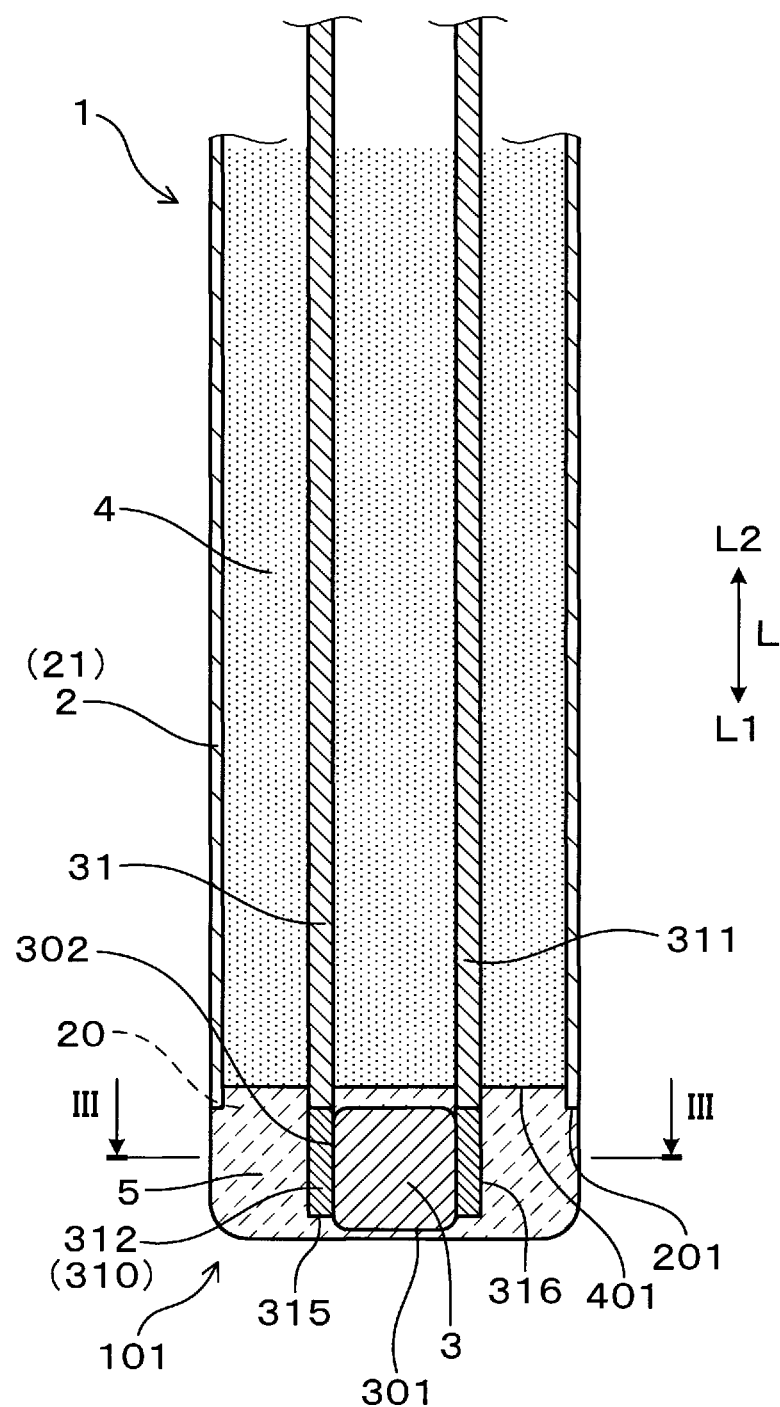
FIG. 1 is a cross-sectional view of showing a main part of a temperature sensor according to an embodiment of the present disclosure.

As shown in FIG. 1, a temperature sensor 1 according to an embodiment of the present disclosure includes a metal tube 2, a temperature sensing element 3, a pair of lead wires 31, an insulating support material 4, and a coating material 5. The metal tube 2 has an opening as an opening tip portion 20 at a tip of the metal tube 2. The temperature sensing element 3 is disposed at the opening tip portion 20 for measuring the temperature of measurement target gas G in a measurement environment. Each of the pair of lead wires 31 includes a lead tip portion 310 that contains at least one of platinum (Pt) and platinum alloy and contacts with the surface of the temperature sensing element 3. Most portions of the pair of lead wires 31 other than the lead tip portions 310 are disposed in the metal tube 2.

The insulating support material 4 is disposed in the metal tube 2 and is made of ceramic for insulating the pair of lead wires 31 from the metal tube 2 and supporting the pair of lead wires 31 in the metal tube 2. The coating material 5 is disposed at the opening tip portion 20 of the metal tube 2 in a state of covering the temperature sensing element 3, the lead tip portions 310, and a tip surface 401 of the insulating support material 4 and has a property of not allowing measurement target gas G to pass through. The coating material 5 contains oxide and at least one kind of platinum, platinum alloy, and platinum-containing oxide that are dispersed in the oxide.

In the temperature sensor 1 according to the present embodiment, the direction along the central axis of the metal tube 2 is referred to as an axial direction L. In the axial direction L, the side on which the temperature sensing element 3 is disposed in the metal tube 2 is referred to as a tip side L1, and the side opposite to the tip side L1 is referred to as a base end side L2.

The temperature sensor 1 according to the present embodiment will be described in detail.
Temperature Sensor 1

The temperature sensor 1 is mounted in a vehicle and used for measuring the temperature of a fluid flowing in an intake pipe or an exhaust pipe of an internal combustion engine in an automobile. The temperature sensor 1 according to the present embodiment is disposed in the exhaust pipe and used for measuring the temperature of exhaust gas flowing in the exhaust pipe. The temperature of exhaust gas is used for controlling the combustion in the internal combustion engine by an electronic control unit (ECU). The temperature of exhaust gas can be used, for example, for detecting the temperature of an exhaust purification catalyst disposed in the exhaust pipe. The temperature sensor 1 according to the present embodiment can be used to control the temperature of the exhaust purification catalyst to a target temperature in a high temperature region exceeding 1000° C.
Temperature Sensing Element 3

The temperature sensing element 3 of the temperature sensor 1 according to the present embodiment is a thermistor element that is composed of a sintered body of oxide semiconductor as a thermistor material. The thermistor element may be a negative temperature coefficient (NTC)

thermistor of which electric resistance value decreases as the temperature of the thermistor element increases. Other than NTC thermistor, the thermistor element may be a positive temperature coefficient (PTC) thermistor of which electric resistance value abruptly increases as the temperature of the thermistor element increases when the temperature exceeds a predetermined temperature or may be a critical temperature resistor (CTR) thermistor of which electric resistance value abruptly decreases when the temperature of the thermistor element exceeds a predetermined temperature.

The temperature sensing element 3 is composed of a composition of an oxide semiconductor having a perovskite structure as a material composing the semiconductor. The temperature sensing element 3 is formed as a sintered body of the oxide semiconductor. The composition composing the temperature sensing element 3 of the temperature sensor 1 according to the present embodiment is composed of a complex oxide (composite metal oxide) containing $YCrMnO_3$ and $Y_2O_3$.

The temperature sensing element 3 may be a temperature sensing resistance element composed of metal such as platinum, copper, and nickel and having a property of an increased electrical resistance value as the temperature of the temperature sensing resistance element rises.

Lead Wires 31

As shown in FIG. 1, the pair of lead wires 31 is composed of various metallic materials having conductivity. The pair of lead wires 31 of the temperature sensor 1 according to the present embodiment are constituted of a pair of first wire portions 311 supported by the insulating support material 4 and a pair of second wire portions 312 serving as the pair of lead tip portions 310 and protruding from the insulating support material 4. Each first wire portion 311 and each second wire portion 312 are joined to each other by welding. The pair of first wire portions 311 and the pair of second wire portions 312 are made of different materials.

The pair of first wire portions 311 are formed as a sheath pin together with the metal tube 2 and the insulating support material 4. The pair of first wire portions 311 are composed of stainless steel or Inconel (registered trademark, superalloy containing nickel base). The pair of second wire portions 312 are composed of platinum (Pt) or platinum-rhodium (Pt—Rh) alloy. The pair of first wire portions 311 are joined with the pair of second wire portions 312, respectively, in a mutually abutting state. The pair of first wire portions 311 may be joined with the pair of second wire portions 312, respectively, in a mutually overlapping state.

The pair of first wire portions 311 may be composed of a wire of SUS310S, an invar wire made of alloy of iron and nickel, a super invar wire, a nickel wire, a nickel chrome wire, and an iron chrome wire. The platinum alloy composing the pair of second wire portions 312 serving as the pair of lead tip portions 310 is Pt—Rh alloy but may be alloy of platinum and at least one of Ru (ruthenium), Pd (palladium), Os (osmium), and Ir (iridium) in the platinum group metal.

The whole of the pair of lead wires 31 may be composed of the same metallic material. In the case, each lead wire 31 may be composed of a platinum wire or a platinum alloy wire composed of alloy of platinum and other kinds of metal. The platinum alloy wire may be composed, in particular, of an alloy of platinum and at least one kind of Ru, Rh, Pd, Os, and Ir in the platinum group metal.

Each lead tip portion 310 of the pair of lead wires 31 refers to each portion of the pair of lead wires 31, protruding from the insulating support material 4 on the tip side L1 and contacting with the temperature sensing element 3. In the temperature sensor 1 according to the present embodiment, the lead tip portions 310 are formed by the second wire portions 312.

In the temperature sensor 1 according to the present embodiment, each lead tip portion 310 is bonded to the surface of the temperature sensing element 3 by platinum paste containing platinum and solvent. When the coating material 5 disposed on the surfaces of the temperature sensing element 3 and the lead tip portions 310, is sintered, the solvent in the platinum paste is volatilized, so that the temperature sensing element 3 and the lead tip portions 310 are bonded to each other.

The lead tip portions 310 may be in press contact with the surface of the temperature sensing element 3 without being bonded to the temperature sensing element 3. In the case, when the temperature sensing element 3 is inserted between the pair of the lead tip portions 310, the pair of the lead tip portions 310 can be brought into press contact with the temperature sensing element 3. When the coating material 5 covers the temperature sensing element 3 and the pair of the lead tip portions 310, the pair of the lead tip portions 310 can be brought into press contact with the temperature sensing element 3.

Metal Tube 2

Figure 2:
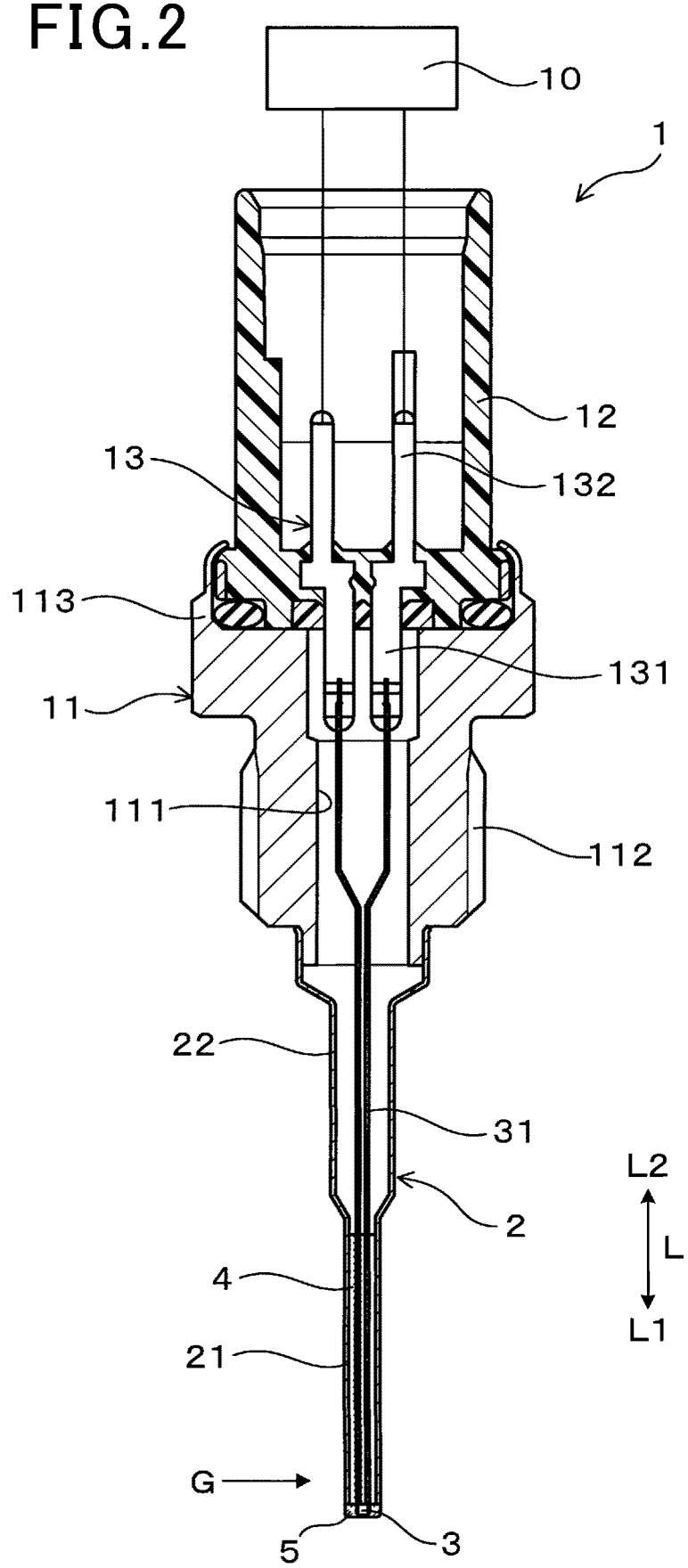
FIG. 2 is a cross-sectional view showing the entire temperature sensor according to the embodiment.

As shown in FIG. 2, the metal tube 2 is called a sheath tube and is composed of a metal material. The metal tube 2 is formed in a cylindrical shape. The metal tube 2 has the smallest outer diameter and the smallest inner diameter in the tip side tube portion 21 in which the temperature sensing element 3 is disposed. The outer diameter and the inner diameter of the base side tube portion 22 located on the base end side L2 relative to the tip side tube portion 21 are formed greater than those of the tip side tube portion 21, respectively. The metal tube 2 may be composed of a tube of Inconel (registered trademark). Instead of the tube of Inconel, the metal tube 2 may be composed of a tube of SUS310S, a tube of austenitic stainless steel, a tube of ferritic chromium steel, a tube of heat resistant cobalt alloy, a tube of nickel alloy, and a tube of iron chrome alloy. In order to facilitate the manufacture of the temperature sensor 1, the metal tube 2 may be formed by connecting a plurality of tubes appropriately by a joining means such as welding.

Housing 11

As shown in FIG. 2, the metal tube 2 is mounted on a housing 11 attached to an exhaust pipe. The housing 11 has an arrangement hole 111 for arranging the pair of lead wires 31 and a terminal 13 of a connector 12, an outer peripheral thread 112 for attaching the temperature sensor 1 to the exhaust pipe, and a connecting portion 113 for connecting the connector 12 to the housing 11. A tip portion 131 of the terminal 13 of the connector 12 is inserted into the arrangement hole 111.

Connector 12

As shown in FIG. 2, the connector 12 made of insulating resin is provided with a terminal (connection terminal) 13 to which each lead wire 31 is joined by welding. The tip portion 131 of the terminal 13 protrudes from the connector 12 so that each lead wire 31 is connected. The base end portion 132 of the terminal 13 is connected to a control device 10 that controls the operation of the temperature sensor 1. The control device 10 may be an engine control unit or may be a sensor control unit (SCU) that is separate from the engine control unit. The terminal 13 is composed of a conductive metallic material.

Insulating Support Member 4

As shown in FIGS. 1 and 2, the insulating support material 4 is composed of insulating metal oxide such as magnesium oxide (MgO). The insulating support material 4 may be composed of aluminum oxide ($Al_2O_3$). The insulating support material 4 is composed of a plurality of ceramic particles such as magnesium oxide disposed in the tip side tube portion 21 of the metal tube 2. The plurality of ceramic particles composing the insulating support material 4 are compressed and closely adhered to each other.

The insulating support material 4 is filled in the tip side tube portion 21 of the metal tube 2 and is not filled in the base side tube portion 22 of the metal tube 2. In other words, the insulating support material 4 is integrally disposed in a continuous manner in the axial direction L in the tip side tube portion 21 of the metal tube 2.

Since the insulating support material 4 is filled in the tip side tube portion 21 of the metal tube 2, the pair of lead wires 31 are strongly supported by the metal tube 2 in the tip side tube portion 21 of the metal tube 2. The insulating support material 4 is in contact with the outer periphery of the pair of lead wires 31 and the inner periphery of the tip side tube portion 21 of the metal tube 2. The insulating support material 4 is disposed up to the tip position of the tip side tube portion 21 in the inner periphery of the tip side tube portion 21 of the metal tube 2.

The metal tube 2, the first wire portions 311 of the pair of lead wires 31, and the insulating support material 4 may be formed as a sheath pin. In the case, the ceramic particles composing the insulating support material 4 closely adhere to each other when a process of reducing the diameter of the sheath pin is performed.

Coating Material 5

Figure 3:
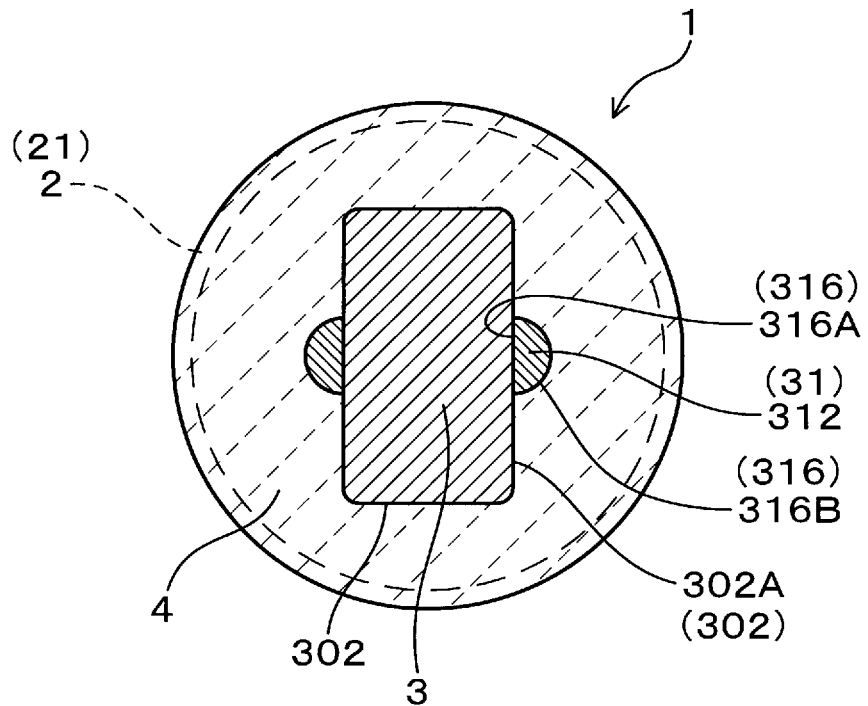
FIG. 3 is a cross-sectional view taken along the line III-III of FIG. 1, of showing a main part of the temperature sensor according to the embodiment.
Figure 5:
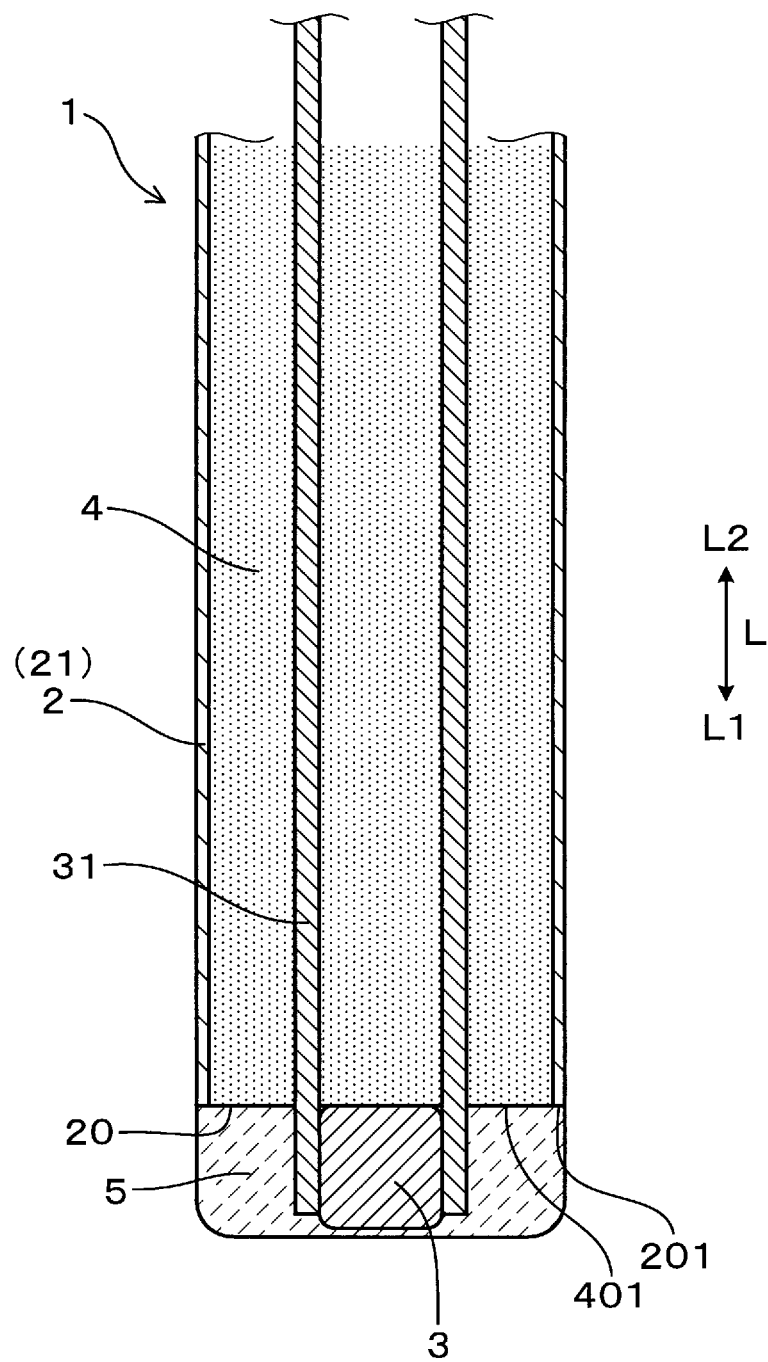
FIG. 5 is a cross-sectional view showing a main part of another temperature sensor according to the embodiment.
Figure 6:
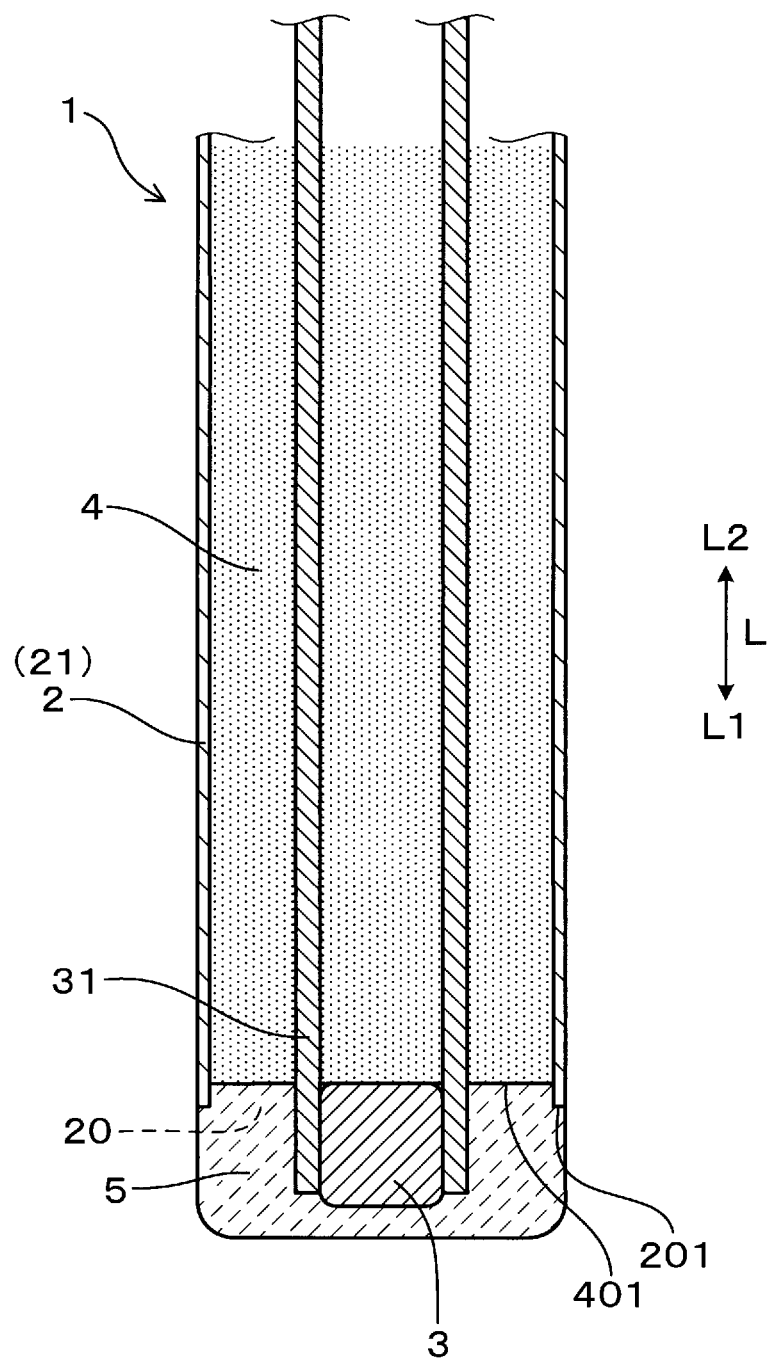
FIG. 6 is a cross-sectional view showing a main part of still another temperature sensor according to the embodiment.

As shown in FIGS. 1 and 3, no metallic cover is provided at the tip of the metal tube 2 of the temperature sensor 1 according to the present embodiment. The coating material 5 has a function of maintaining a state in which the pair of lead wires 31 are in contact with the temperature sensing element 3 and a function of not allowing measurement target gas G to pass through as the outermost peripheral portion of a detecting tip portion 101 of the temperature sensor 1 instead of a metallic cover. As shown in FIGS. 1 and 5-6, no portion of the metal tube 2 is positioned on a tip side of a tip end portion of the temperature sensing element 3 in an axial direction L of the metal tube 2.

The coating material 5 is disposed at the outermost peripheral portion of the detecting tip portion 101 of the temperature sensor 1, with which the measurement target gas G is in contact. The outermost peripheral portion means a portion on the outer peripheral side directly exposed to the measurement target gas G. Since the coating material 5 is provided instead of a metallic cover, heat conductivity between the measurement target gas G and the temperature sensing element 3 can improve, and the responsiveness of the temperature sensor 1 can improve.

In order to protect the coating material 5, a protective cover for covering the periphery of the coating material 5 may be disposed at the detecting tip portion 101 of the temperature sensor 1. In the case, the coating material 5 is disposed at the outermost peripheral portion. The measurement target gas G is in contact with the coating material 5.

The coating material 5 may be composed of metal oxide and platinum dispersed in the metal oxide. The coating material 5 may be composed of metal oxide and platinum alloy dispersed in the metal oxide. The coating material 5 may be composed of metal oxide and platinum-containing oxide dispersed in the metal oxide. In the metal oxide of the coating material 5, two or greater kinds of platinum, platinum alloy, and platinum-containing oxide may be mixed and dispersed. The platinum-containing oxide refers to a mixture of platinum and oxide. The platinum-containing oxide may be one in which platinum and oxide are integrated in the form of particles. The particles of the platinum-containing oxide may contain metal other than platinum.

The coating material 5 may be formed by sintering a plurality of metal oxide particles (granular objects) and a plurality of particles such as platinum, platinum alloy, and platinum-containing oxide, which are dispersed in the plurality of metal oxide particles. The coating material 5 may be formed by sintering metal oxide and a plurality of particles containing platinum, platinum alloy, and platinum-containing oxide. In the case, due to using the plurality of particles, platinum is dispersed in the metal oxide.

In the coating material 5, the content of platinum contained in at least one of platinum and platinum alloy is in the range of 0.001 to 30 mass %. The content of platinum refers to the total content of the platinum element in the entire coating material 5. The content of platinum in the coating material 5 is preferably 0.05 mass % or greater. When the content of platinum in the coating material 5 is less than 0.001 mass %, platinum or platinum alloy is not sufficiently dispersed in the oxide, so that the coating material 5 is easily separated from the lead tip portions 310. On the other hand, when the content of platinum in the coating material 5 is greater than 30 mass %, the amount of platinum or platinum alloy dispersed in the oxide increases, so that the coating material 5 is easily separated from the lead tip portions 310.

The oxide in the coating material 5 contains $Al_2O_3$. The oxide in the coating material 5 may be composed of $Al_2O_3$ (alumina). The oxide in the coating material 5 may be composed of $Al_2O_3$ and at least one of $ZrO_2$ (zirconia), $SiO_2$ (silica), $Y_2O_3$ (yttria), $Al_2O_3$—$SiO_2$ (alumina-silica), and $ZrSiO_4$ (zircon). The oxide in the coating material 5 may be formed by sintering a plurality of particles and being integrated. $Al_2O_3$—$SiO_2$ indicates composite particles in which $Al_2O_3$ and $SiO_2$ are mixed.

The oxide in the coating material 5 may be composed of particles of $Al_2O_3$ and particles of other metal oxide such as $ZrO_2$ or may be composed of composite particles in which each material is mixed.

The oxide in the coating material 5 preferably contains a composition that composes the temperature sensing element 3. In the case, since the temperature sensing element 3 and the coating material 5 include the same substance, the adhesiveness between the temperature sensing element 3 and the coating material 5 increases, which can make it hard for the coating material 5 to separate from the temperature sensing element 3.

The temperature sensing element 3 of the temperature sensor 1 according to the present embodiment is composed of composite oxide containing $YCrMnO_3$ and $Y_2O_3$. The oxide in the coating material 5 contains complex oxide containing $YCrMnO_3$ and $Y_2O_3$ in addition to $Al_2O_3$. The composite oxide exists as other particles in particles such as $Al_2O_3$ and is dispersed in particles of $Al_2O_3$. The composite oxide may exist as particles mixed with $Al_2O_3$. In other words, the composite particles of $YCrMnO_3$ and $Y_2O_3$ may be dispersed in particles such as $Al_2O_3$. The particles of $YCrMnO_3$ and the particles of $Y_2O_3$ may be dispersed in the particles of $Al_2O_3$.

The platinum alloy composing the coating material 5 may be composed of at least one kind of Pt—Rh (platinum-rhodium alloy), Pt—Pd (platinum-palladium alloy), Pt—Ir (platinum-iridium alloy), Pt—Ru (platinum-ruthenium alloy), Pt—Os (platinum-osmium alloy), Pt—Ni (platinum-nickel alloy), Pt—W (platinum-tungsten alloy), Pt—Nb (platinum-niobium alloy), Pt—Ta (platinum-tantalum alloy), Pt—Hf (platinum-hafnium alloy), Pt—Ti (platinum-titanium alloy), Pt—Au (platinum-gold alloy), Pt—Mo (platinum-molybdenum alloy), Pt—Co (platinum-cobalt alloy), and Pt—Ir—Ti (platinum-iridium-titanium alloy).

The platinum-containing oxide composing the coating material 5 may be at least one of Pt—$ZrO_2$ (platinum-zirconia particles) and Pt—Rh—$ZrO_2$ (platinum-rhodium-zirconia particles).

The coating material 5 is formed as a sintered body by sintering particles of metal oxide and at least one kind of particles of platinum, particles of platinum alloy, and particles of platinum-containing oxides. The coating material 5 may contain other additives such as an inorganic binder (binding agent).

The coating material 5 is formed by using particles of metal oxide, at least one kind of particles of platinum, particles of platinum alloy, and particles of platinum-containing oxide, and slurry containing solvent such as water. When the slurry is heated for sintering, and the solvent is volatilized, the particles of the metal oxide and at least one kind of the particles of platinum, the particles of platinum alloy, and the particles of the platinum-containing oxide, form a sintered body.

When the particles of the metal oxide and at least one kind of the particles of platinum, the particles of platinum alloy, and the particles of the platinum-containing oxide are sintered, the gaps between the respective particles are filled, so that the coating material 5 can obtain the property of not allowing measurement target gas G to pass through.

In the case where slurry for forming the coating material 5 contains inorganic binder, the gaps between the respective particles are filled with the inorganic binder, so that the coating material 5 can obtain the property of not allowing measurement target gas G to pass through.

Figure 4:
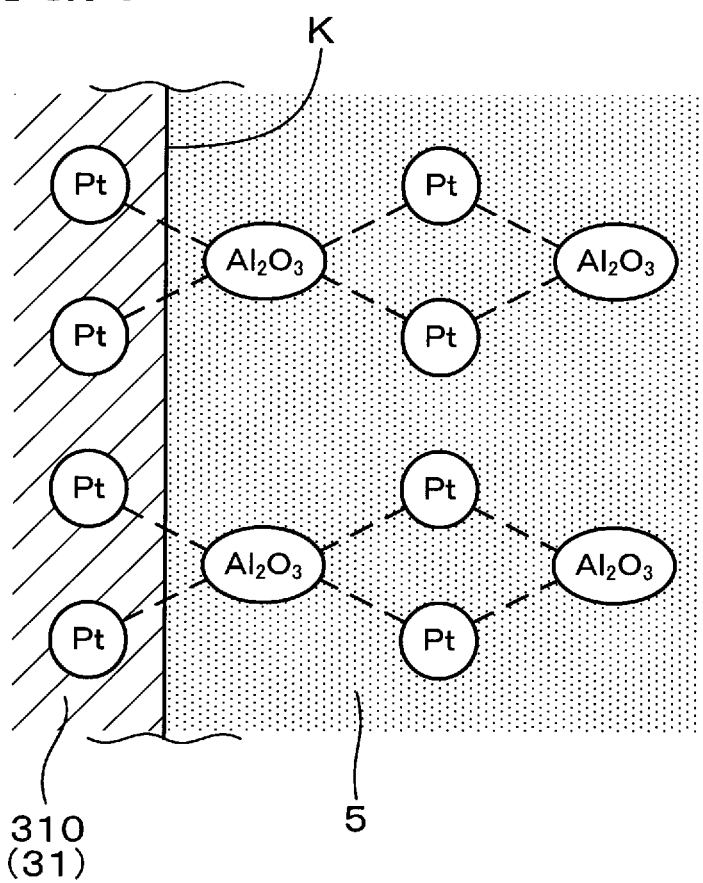
FIG. 4 is a schematic explanatory view showing a bonding state between a lead tip portion of each lead wire and a coating material of the temperature sensor according to the embodiment.

FIG. 4 is a schematic view of showing a bonding state between each lead tip portion 310 of the lead wires 31 and the coating material 5.

When the coating material 5 is heated to a high temperature of 1000 to 1100° C., the coating material 5 closely adheres to the temperature sensing element 3, the lead tip portions 310, and the tip surface 401 of the insulating support material 4 and is sintered. Then, at least one of platinum and platinum alloy that are contained in the lead tip portions 310 and at least one kind of platinum, platinum alloy, and platinum-containing oxide that are contained in slurry of the coating material 5 are bonded via oxygen in the oxide contained in the coating material 5.

When the slurry of the coating material 5 is heated to a high temperature, oxygen in $Al_2O_3$ contained in the slurry has a property of chemically bonding with platinum. Oxygen in $Al_2O_3$ in the coating material 5 and platinum in the coating material 5, which may be platinum contained in platinum alloy or platinum-containing oxide, chemically bond to each other. Oxygen in $Al_2O_3$ in the coating material 5 and platinum in the lead tip portions 310, which may be platinum contained in platinum alloy, chemically bond to each other at an interface K between the coating material 5 and each lead tip portion 310.

As a result, the wettability at the interface K between the coating material 5 and each lead tip portion 310 improves, so that the coating material 5 and each lead tip portion 310 are reactive-sintered. Therefore, the gap at the interface K between the coating material 5 and each lead tip portion 310 is filled, so that measurement target gas G cannot intrude into the interface K between the coating material 5 and each lead tip portion 310.

As shown in FIG. 1, the oxide contained in the coating material 5 is sintered with the oxide in the tip surface 401 of the insulating support material 4. As a result, the coating material 5 and the tip surface 401 of the insulating support material 4 are bonded, so that the measurement target gas G is difficult to intrude into the interface between the coating material 5 and the tip surface 401 of the insulating support material 4.

The oxide semiconductor that is contained in the coating material 5 and is the same component as the composition of the temperature sensing element 3, is bonded with the oxide semiconductor composing the temperature sensing element 3. As a result, the measurement target gas G is difficult to intrude into the interface between the coating material 5 and the temperature sensing element 3.

Thus, the adhesiveness between the coating material 5 and the temperature sensing element 3 can improve by using the coating material 5 in which platinum and $YCrMnO_3$+ $Y_2O_3$ are dispersed in particles of $Al_2O_3$ as oxide, so that the temperature sensing element 3 can be protected from the measurement target gas G.

Since the coating material 5 is formed by metal oxide as a main raw material, the coating material 5 has excellent heat resistance so that no change occurs in properties when the coating material 5 is heated to 1000° C. Since the metal tube 2, the temperature sensing element 3, and the pair of lead wires 31 are composed of a metal material or oxide semiconductor, the metal tube 2, the temperature sensing element 3, and the pair of lead wires 31 have heat resistance so that no change occurs in properties when the metal tube 2, the temperature sensing element 3, and the pair of lead wires 31 are heated to 1000° C. Furthermore, in the temperature sensor 1 according to the present embodiment, the coating material 5, the metal tube 2, the temperature sensing element 3, and the pair of lead wires 31 have heat resistance so that no change occurs in properties at 1050° C.

The usable temperature of the temperature sensor 1 according to the present embodiment is set to a normal temperature (20° C.) to 1200° C. In a conventional temperature sensor using a metallic cover, the usable temperatures of a temperature sensing element and a pair of lead wires that correspond to the temperature sensing element 3 and the pair of lead wires 31 in the present embodiment, respectively, are set up to 900° C. The usable temperature of the conventional temperature sensor, is restricted to 900° C. due to the possibility of peeling between the temperature sensing element and a lead tip portion that correspond to the temperature sensing element 3 and each lead tip portion 310 in the present embodiment, respectively.

On the other hand, in the temperature sensor 1 according to the present embodiment, the coating material 5 is chemically bonded to the lead tip portions 310 by devising the coating material 5 so that no gap is formed between the coating material 5 and each lead tip portion 310. As a result, peeling between the temperature sensing element 3 and each lead tip portion 310 is prevented from occurring, so that an upper limit value of the usable temperature of the temperature sensor 1 can increase.

Arrangement Relationship of Temperature Sensing Element 3, Lead Wires 31, and Coating Material 5

As shown in FIG. 1, the tip surface 401 of the insulating support material 4 in the present embodiment is located on the base end side L2 relative to the tip surface 201 of the metal tube 2. As shown in FIG. 5, the tip surface 201 of the metal tube 2 and the tip surface 401 of the insulating support material 4 may be located substantially at the same position in the axial direction L. As shown in the same drawing, each lead wire 31 may be a single continuous metal wire composed of the same material as each other.

As shown in FIG. 6, a part of the temperature sensing element 3 may be located on the base end side L2 relative to the tip surface 201 of the metal tube 2. In the case, a part of the temperature sensing element 3 is disposed on the tip side L1 relative to the opening tip portion 20 of the metal tube 2, and a remaining part of the temperature sensing element 3 is disposed on the base end side L2 relative to the opening tip portion 20.

As shown in FIGS. 5 and 6, the temperature sensing element 3 is disposed in contact with the tip surface 401 of the insulating support material 4. The temperature sensing element 3 is formed in a plate shape having a pair of main surfaces 302A parallel to each other, in other words, in a chip shape. The main surface 302A indicates to the surface having the largest surface area among the plurality of surfaces.

The second wire portion 312 serving as the lead tip portion 310 of each lead wire 31 in the present embodiment are formed in a shape having a flat surface 316A and a curved surface 316B, in other words, in a substantially semicircular cross-sectional shape. The flat surface 316A of each lead wire 31 faces the main surface 302A of the temperature sensing element 3. The first wire portions 311 of the lead wires 31 supported by the insulating support material 4 in the metal tube 2 are a general round wire, in other words, formed in a circular cross-sectional shape.

Figure 7:
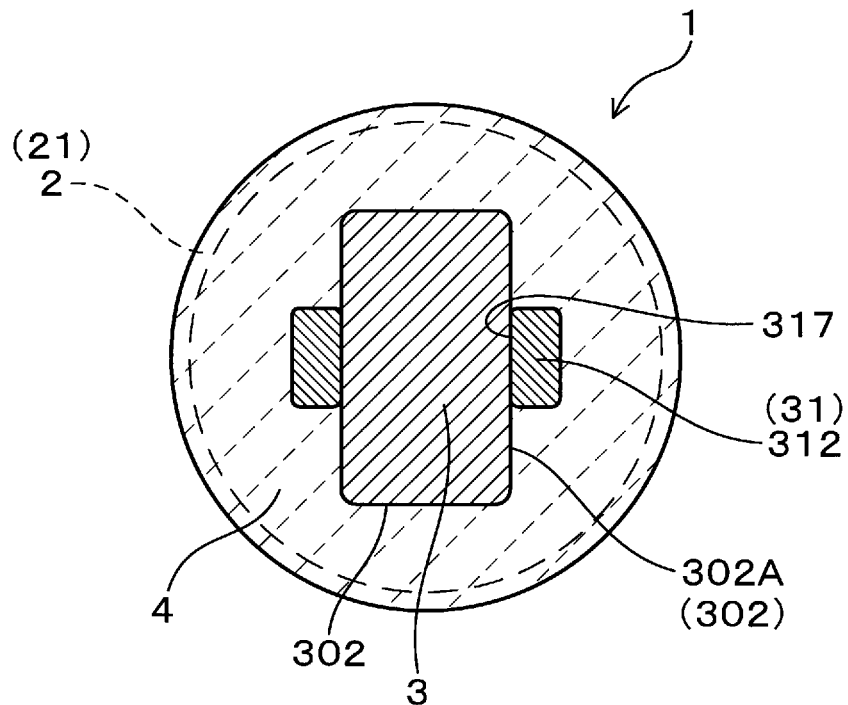
FIG. 7 is a cross-sectional view corresponding to the cross-sectional view taken along the line III-III in FIG. 1, showing a main part of yet another temperature sensor according to the embodiment.

As shown in FIG. 7, the second wire portions 312 of the lead wires 31 may be formed in a square cross-sectional shape. In the case, the side surface 317 of each second wire portion 312 is in contact with the main surface 302A of the temperature sensing element 3. The cross-sectional areas and cross-sectional shapes of the pair of lead wires 31 are not necessarily formed in the same manner. The width of each of the pair of lead wires 31 may be smaller than that of the temperature sensing element 3 or may be substantially the same as that of the temperature sensing element 3 or may be greater than that of the temperature sensing element 3. The above-described width means the width in the direction orthogonal to the axial direction L of the temperature sensor 1 and the direction in which the temperature sensing element 3 and the pair of lead wires 31 face each other. The cross-sectional area of each lead wire 31 may be smaller than that of the temperature sensing element 3 or may be substantially the same as that of the temperature sensing element 3 or may be greater than that of the temperature sensing element 3.

As shown in FIG. 1, the pair of lead wires 31 are formed from the inside of the metal tube 2 to the outside of the metal tube 2. The second wire portion 312 of each lead wire 31 is disposed at a position protruding on the tip side L1 relative to the tip surface 201 of the metal tube 2. With the configuration, the temperature sensing element 3 can be easily disposed between the second wire portions 312 of the pair of lead wires 31, so that the temperature sensor 1 can be easily manufactured.

The coating material 5 continuously covers the tip surface 401 of the insulating support material 4 and the tip surface 201 of the metal tube 2. As a result, the coating material 5 can be fixed not only to the tip surface 401 of the insulating support material 4 but also to the tip surface 201 of the metal tube 2. Thus, the state of fixation of the coating material 5 in the detecting tip portion 101 of the temperature sensor 1 can be further strengthened.

When the temperature of measurement target gas G is measured, the tip surface 301 of the temperature sensing element 3 serves as a portion that detects a change in the temperature of the measurement target gas G earliest. Therefore, the thickness of the coating material 5 on the tip surface 301 of the temperature sensing element 3 is preferably as thin as possible. The thickness of the coating material 5 on the tip surface 301 of the temperature sensing element 3 may be set to, for example, 10 to 200 μm. In the case, the temperature of the temperature sensing element 3 can promptly follow the temperature of the measurement target gas G.

As shown in FIG. 3, the surface of the temperature sensing element 3 and the surface of each lead tip portion 310 of the pair of lead wires 31, which face each other, can be made flat so as to form a good contact state. Specifically, the main surface 302A of the temperature sensing element 3 and the flat surface 316A of each of the pair of the second wire portions 312, which face each other, can be formed to be flat surfaces so that the whole of the flat surface 316A are in contact with of the main surface 302A substantially uniformly.

The surface roughnesses of the main surface 302A of the temperature sensing element 3 and the flat surface 316A of each lead tip portions 310, which face each other, can be set within the range of 1 to 3 μm in Rmax defined in conformity with JIS B0601-1970 (ISO 468-1982).

Manufacturing Method

A method for manufacturing the main portion of the temperature sensor 1 according to the present embodiment will be described with reference to the flowchart of FIG. 8.

Figure 8:
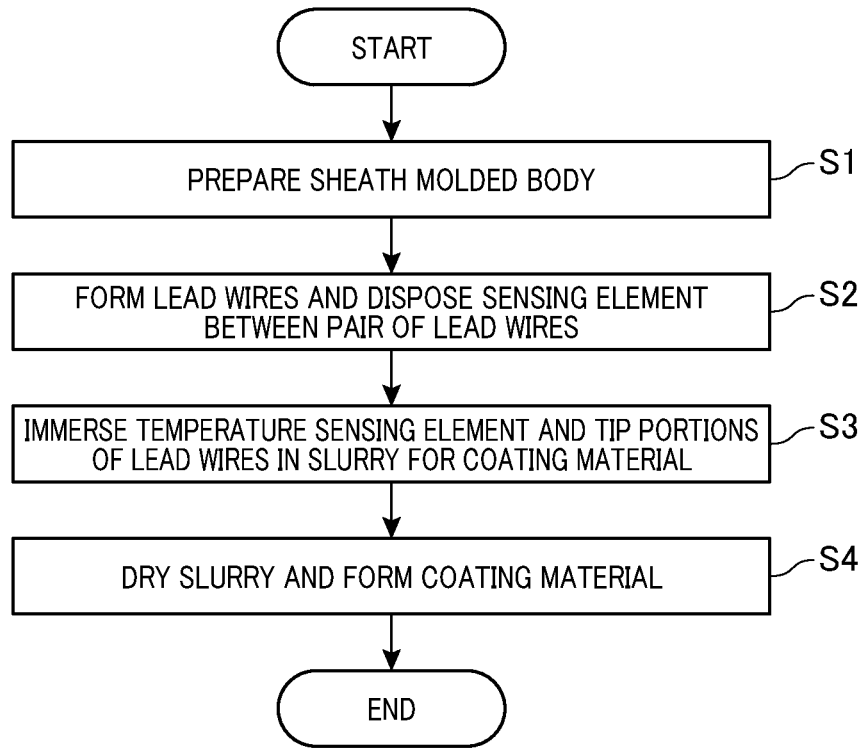
FIG. 8 is a flowchart showing a method of manufacturing a main part of a temperature sensor according to the embodiment.
Figure 9:
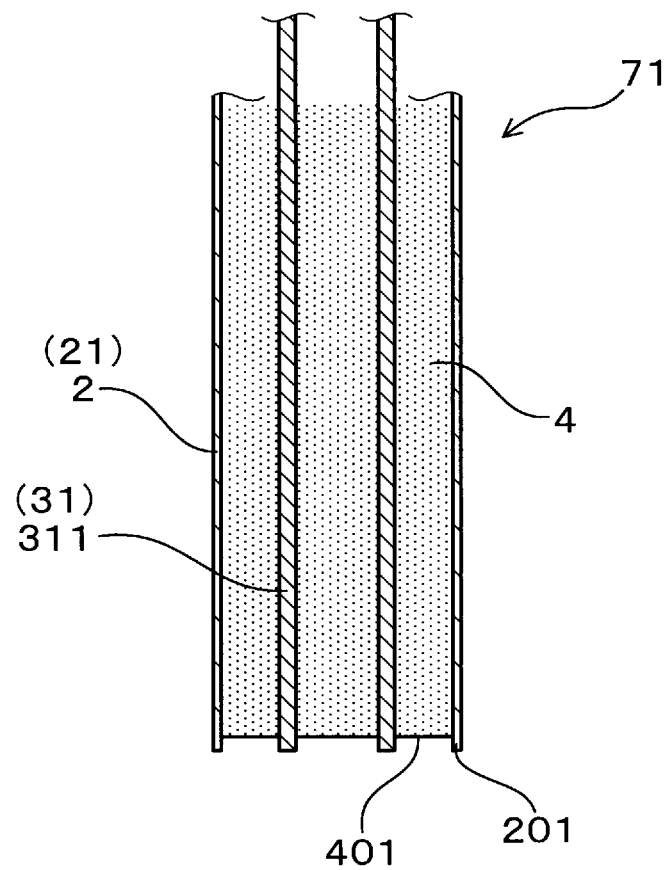
FIG. 9 is a cross-sectional view showing a state in which a sheath molded body is prepared in a manufacturing process of the temperature sensor according to the embodiment.

As shown in FIG. 9, a sheath molded body 71 is prepared (step S1 of FIG. 8). The sheath molded body 71 is provided with the metal tube 2, the first wire portions 311 of the pair of lead wires 31, and the insulating support material 4. The metal tube 2 of the sheath molded body 71 in the present manufacturing method indicates to the tip side tube portion 21 of the metal tube 2. The first wire portions 311 of the pair of lead wires 31 are inserted into the metal tube 2. Then, the gap in the metal tube 2 is filled with the insulating support material 4, so that the sheath molded body 71 is formed.

Figure 10:
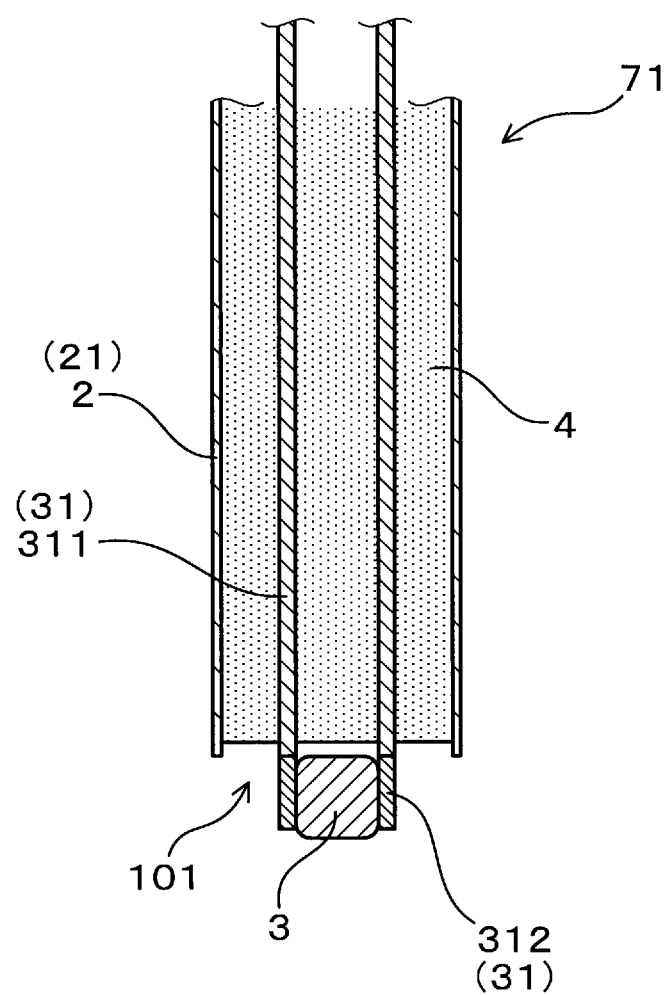
FIG. 10 is a cross-sectional view showing a state in which a pair of lead wires are formed, and a temperature sensing element is disposed between the pair of lead wires in the manufacturing process of the temperature sensor according to the embodiment.

Next, as shown in FIG. 10, in a state in which the temperature sensing element 3 is sandwiched between the second wire portions 312 serving as the lead tip portions 310 of the pair of lead wires 31, the second wire portions 312 are joined to the first wire portions 311 of the pair of lead wires 31 in the sheath molded body 71, respectively, by laser welding (step S2). Thus, an intermediate body of the temperature sensor 1 is formed at the opening tip portion 20 of the metal tube 2 in a state in which the temperature sensing element 3 is disposed between the second wire portions 312 of the pair of lead wires 31.

After the second wire portions 312 of the pair of lead wires 31 are joined to the first wire portions 311 of the pair of lead wires 31 in the sheath molded body 71, respectively, the temperature sensing element 3 may be inserted and disposed between the second wire portions 312.

Figure 11:
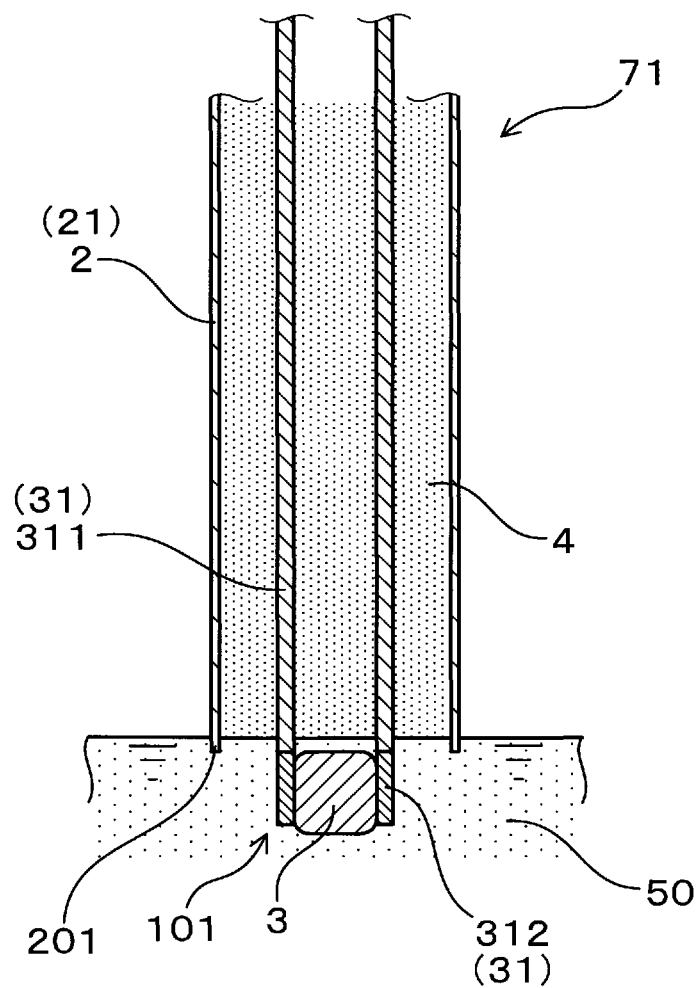
FIG. 11 is a cross-sectional view showing a state in which the temperature sensing element and lead tip portions of the pair of lead wires are immersed in slurry for forming a coating material in the manufacturing process of the temperature sensor according to the embodiment.

Next, as shown in FIG. 11, the detecting tip portion 101 of the intermediate body of the temperature sensor 1 is immersed in slurry 50 composing the coating material 5 (step S3). At the time, the temperature sensing element 3 and the lead tip portions 310 of the pair of lead wires 31 are immersed in the slurry 50 so that the tip surface 201 of the metal tube 2 is brought into contact with the slurry 50.

Instead of immersing the detecting tip portion 101 of the intermediate body of the temperature sensor 1 in the slurry 50, the slurry 50 may be adhered to the detecting tip portion 101 by a process such as coating, spraying, and vapor deposition.

Next, when the detecting tip portion 101 of the intermediate body of the temperature sensor 1 is taken out from the slurry 50, the slurry 50 adheres to the temperature sensing element 3, the lead tip portions 310 of the pair of lead wires 31, the tip surface 401 of the insulating support material 4, and the tip surface 201 of the metal tube 2. That is, the temperature sensing element 3, the lead tip portions 310 of the pair of lead wires 31, the tip surface 401 of the insulating support material 4, and the tip surface 201 of the metal tube 2 are covered with the slurry 50.

Next, the detecting tip portion 101 of the intermediate body of the temperature sensor 1 is heated to 1000 to 1100° C.

The slurry 50 adhered to the detecting tip portion 101 is dried. The solvent in the slurry 50 is volatilized. Oxide and platinum in the slurry 50 are sintered (step S4). The coating material 5 formed by sintering oxide and platinum in the slurry 50, is fixed to the temperature sensing element 3, the lead tip portions 310 of the pair of lead wires 31, the tip surface 401 of the insulating support material 4, and the tip surface 201 of the metal tube 2. Thus, an assembly of the temperature sensor 1, in which the temperature sensing element 3 and the lead tip portions 310 of the pair of lead wires 31 are covered with the coating material 5, is formed.

Function and Effect

In the temperature sensor 1 according to the present embodiment, the tip of the metal tube 2 opens as the opening tip portion 20. The temperature sensing element 3 disposed at the opening tip portion 20 is covered with the coating material 5 forming the outermost peripheral portion of the detecting tip portion 101 of the temperature sensor 1. No metallic cover (curved-shaped tip part) is provided for covering the temperature sensing element 3 at the opening tip portion 20 of the metal tube 2. With the configuration, heat transfer such as heat radiation and heat transmission (heat convection), can easily occur between the detecting tip portion 101 of the temperature sensor 1 and measurement target gas G in measurement environment. As a result, the time until the temperature of the temperature sensing element 3 reaches the temperature of the measurement target gas G can be shortened, so that the responsiveness of the temperature sensor 1 can be improved.

The coating material 5 is disposed at the opening tip portion 20 of the metal tube 2 in a state in which the temperature sensing element 3, the lead tip portions 310 of the pair of lead wires 31, the tip surface 401 of the insulating support material 4, and the tip surface 201 of the metal tube 2 are covered with the coating material 5. The coating material 5 contains oxide containing $Al_2O_3$ and a platinum component dispersed in the oxide. The lead tip portions 310 contain a platinum component. The platinum component refers to platinum or platinum contained in platinum alloy or platinum-containing oxide.

At the interface K between the coating material 5 and each of the pair of lead tip portions 310, the oxygen of $Al_2O_3$ contained in the coating material 5 is chemically bonded with the platinum component contained in the coating material 5 and the platinum component contained in the lead tip portions 310 so as to play a role of bonding the platinum component contained in the coating material 5 and the platinum component contained in the lead tip portions 310. Thus, the coating material 5 can be difficult to separate from the lead tip portions 310. At the interface between the coating material 5 and the temperature sensing element 3, the oxide semiconductor contained in the coating material 5 and the oxide semiconductor composing the temperature sensing element 3 are bonded to each other, so that the coating material 5 can be difficult to separate from the element 3.

When the temperature sensor 1 is operated, and the detecting tip portion 101 of the temperature sensor 1 is exposed to the measurement target gas G, for example, at 1000° C. or greater, reducing gas such as hydrogen may be contained in the measurement target gas G. When oxide semiconductor containing oxygen such as $YCrMnO_3+Y_2O_3$ and composing the temperature sensing element 3, is brought into contact with reducing gas such as hydrogen, the oxygen in the oxide semiconductor is reduced by the reducing gas. When the oxygen in the oxide semiconductor is reduced by the reducing gas, the temperature sensing element 3 deteriorates.

In the detecting tip portion 101 of the temperature sensor 1 according to the present embodiment, the measurement target gas G tries to intrude into the interface between the coating material 5 and the tip surface 201 of the metal tube 2. At the time, since the oxide of the coating material 5 and the oxide composing the insulating support material 4 are bonded, the measurement target gas G is suppressed from intruding into the interface between the coating material 5 and the tip surface 401 of the insulating support material 4.

Even when the measurement target gas G intrudes into the interface between the coating material 5 and the tip surface 401 of the insulating support material 4, the measurement target gas G is suppressed from intruding into the interface K between the coating material 5 and each lead tip portion 310 and into the interface between the coating material 5 and the temperature sensing element 3. The coating material 5 has a property of not allowing the measurement target gas G to pass through.

Since the interface K between the coating material 5 and each lead tip portion 310 closely adheres, the adhesiveness of the interface between the coating material 5 and the temperature sensing element 3 is also maintained, so that the coating material 5 can be difficult to separate from the temperature sensing element 3. For the reason, measurement target gas G can be difficult to be brought into contact with the temperature sensing element 3. As a result, even in the case where the temperature sensing element 3 is composed of oxide semiconductor containing oxygen, reducing gas such as hydrogen contained in the measurement target gas G is suppressed from depriving the oxygen in the oxide semiconductor of the temperature sensing element 3. Thus, the temperature sensing element 3 is suppressed from being deteriorated by being exposed to the measurement target gas G, so that the durability (reliability) of the temperature sensor 1 against the measurement target gas G can be maintained high.

Since the main component of the coating material 5 is composed of oxide, the heat tolerance of the coating material 5 can be secured. As a result, the durability (reliability) against heat of the temperature sensor 1 also can be maintained high.

Therefore, the temperature sensor 1 according to the present embodiment, can improve the responsiveness of the temperature sensor 1 and can maintain the high durability (reliability) of the temperature sensor 1.

Confirmation Test

The present confirmation test was performed for evaluating reduction resistance on the composition of various materials composing the coating material 5.

The present confirmation test was performed on test samples 1 to 30, which are the temperature sensors 1 provided with various coating materials 5, and comparative samples 1 and 2, which are temperature sensors provided with coating materials for comparison. Each of the coating materials 5 of the test samples 1 to 30 contains oxide and a platinum component. The coating materials of the comparative samples 1 and 2 contain oxide and no platinum component.

In the temperature sensors of the test samples 1 to 30 and the comparative samples 1 and 2, the temperature sensing elements 3 are composed of composite oxide including $YCrMnO_3$ and $Y_2O_3$ and the lead tip portions 310 of the pair of lead wires 31 are composed of platinum. The metal tubes 2 are composed of Inconel (registered trademark). The insulating support materials 4 are composed of magnesium oxide (MgO). In the temperature sensors of the test samples 1 to 30, the content of platinum in the coating material 5 was 0.05 mass %. The content of platinum-containing oxide in the coating material 5 was 0.05 mass %.

In the present confirmation test, test gas containing 4 vol % of hydrogen and the balance nitrogen, was used. The temperature of the test gas was 1050° C. In the temperature sensors of the test samples 1 to 30 and the comparative samples 1 and 2, the detecting tip portions of the temperature sensors were disposed in the environment in which the test gas flowed at 0.1 L/min.

The evaluation of reduction resistance was conducted based on resistance change rates obtained by measuring resistance values of the temperature sensors of the test samples 1 to 30 and the comparative samples 1 and 2. In the present confirmation test, resistance values between the pair of lead wires 31 of the temperature sensors of the test samples 1 to 30 and the comparative samples 1 and 2 were measured before and after the detecting tip portions of the temperature sensors of the test samples 1 to 30 and the comparative samples 1 and 2 were left for 100 hours in the test gas. The resistance change rate indicates how much the resistance value of each temperature sensor increased after the detecting tip portion of each temperature sensor was exposed to the test gas. The resistance change rate $\Delta R$ was obtained as $\Delta R=(R1-R0)/R0*100(\%)$, assuming that the initial resistance value is R0, and the resistance value after leaving for 100 hours is R1.

When the temperature sensing element 3 is deteriorated by the reducing gas, oxygen in the oxide semiconductor composing the temperature sensing element 3 is deprived, so that the resistance value of the temperature sensing element 3, which is measured via the pair of lead wires 31, becomes high. Therefore, the reduction resistance of the temperature sensors of the test samples 1 to 30 and the comparative samples 1 and 2 can be evaluated by evaluating the resistance change rates.

The results of the confirmation test are shown in Table 1. The results in Table 1 confirmed that the resistance change rates as reduction resistance hardly change in the test samples 1 to 30 in which each coating material 5 contains oxide and a platinum component. On the other hand, the results in Table 1 confirmed that the resistance change rates greatly change in the comparative samples 1 and 2 in which each coating material contains no platinum component.

TABLE 1

| | COATING MATERIAL | | | EVALUATION OF REDUCTION RESISTANCE |
|---|---|---|---|---|
| | OXIDE | PLATINUM | PLATINUM ALLOY OR PLATINUM-CONTAINING OXIDE | RESISTANCE CHANGE RATE (%) (AFTER 00 HOURS) |
| TEST SAMPLE 1 | $Al_2O_3$ | Pt | — | 1.5 |
| TEST SAMPLE 2 | $Al_2O_3$—$ZrO_2$ | Pt | — | 1.5 |
| TEST SAMPLE 3 | $Al_2O_3$—$SiO_2$—$ZrO_2$ | Pt | — | 1.5 |
| TEST SAMPLE 4 | $Al_2O_3$ | Pt | Pt—Rh | 1 |
| TEST SAMPLE 5 | $Al_2O_3$—$ZrO_2$ | Pt | Pt—Rh | 1 |
| TEST SAMPLE 6 | $Al_2O_3$—$SiO_2$—$ZrO_2$ | Pt | Pt—Rh | 1 |
| TEST SAMPLE 7 | $Al_2O_3$ | Pt | Pt—Ir | 1.2 |
| TEST SAMPLE 8 | $Al_2O_3$—$ZrO_2$ | Pt | Pt—Ir | 1.2 |
| TEST SAMPLE 9 | $Al_2O_3$—$SiO_2$—$ZrO_2$ | Pt | Pt—Ir | 1.2 |
| TEST SAMPLE 10 | $Al_2O_3$ | Pt | Pt—Ti | 1.8 |
| TEST SAMPLE 11 | $Al_2O_3$—$ZrO_2$ | Pt | Pt—Ti | 1.8 |
| TEST SAMPLE 12 | $Al_2O_3$—$SiO_2$—$ZrO_2$ | Pt | Pt—Ti | 1.8 |
| TEST SAMPLE 13 | $Al_2O_3$ | Pt | Pt—$ZrO_2$ | 1.1 |
| TEST SAMPLE 14 | $Al_2O_3$—$ZrO_2$ | Pt | Pt—$ZrO_2$ | 1.1 |
| TEST SAMPLE 15 | $Al_2O_3$—$SiO_2$—$ZrO_2$ | Pt | Pt—$ZrO_2$ | 1.1 |
| TEST SAMPLE 16 | $Al_2O_3$ | Pt | Pt—Rh—$ZrO_2$ | 1 |
| TEST SAMPLE 17 | $Al_2O_3$—$ZrO_2$ | Pt | Pt—Rh—$ZrO_2$ | 1 |
| TEST SAMPLE 18 | $Al_2O_3$—$SiO_2$—$ZrO_2$ | Pt | Pt—Rh—$ZrO_2$ | 1 |
| TEST SAMPLE 19 | $Al_2O_3$—$SiO_2$ | Pt | — | 2 |
| TEST SAMPLE 20 | $Al_2O_3$—$ZrSiO_4$ | Pt | — | 1.8 |
| TEST SAMPLE 21 | $Al_2O_3$—$Y_2O_3$ | Pt | — | 1.5 |
| TEST SAMPLE 22 | $Al_2O_3$—$SiO_2$ | Pt | Pt—Rh | 1.5 |
| TEST SAMPLE 23 | $Al_2O_3$—$ZrSiO_4$ | Pt | Pt—Rh | 1.5 |
| TEST SAMPLE 24 | $Al_2O_3$—$Y_2O_3$ | Pt | Pt—Rh | 1.1 |
| TEST SAMPLE 25 | $Al_2O_3$ +$YCrMnO_3$ + $Y_2O_3$ | Pt | — | 1.2 |
| TEST SAMPLE 26 | $Al_2O_3$—$ZrO_2$ + $YCrMnO_3$ + $Y_2O_3$ | Pt | — | 1.2 |
| TEST SAMPLE 27 | $Al_2O_3$—$SiO_2$—$ZrO_2$ + $YCrMnO_3$ + $Y_2O_3$ | Pt | — | 1.2 |

TABLE 1-continued

| | COATING MATERIAL | | | EVALUATION OF REDUCTION RESISTANCE |
|---|---|---|---|---|
| | OXIDE | PLATINUM | PLATINUM ALLOY OR PLATINUM-CONTAINING OXIDE | RESISTANCE CHANGE RATE (%) (AFTER 00 HOURS) |
| TEST SAMPLE 28 | $Al_2O_3$ + $YCrMnO_3$ + $Y_2O_3$ | Pt | Pt—Rh | 1 |
| TEST SAMPLE 29 | $Al_2O_3$—$ZrO_2$ + $YCrMnO_3$ + $Y_2O_3$ | Pt | Pt—Rh | 1 |
| TEST SAMPLE 30 | $Al_2O_3$—$SiO_2$—$ZrO_2$ + $YCrMnO3$ + $Y_2O_3$ | Pt | Pt—Rh | 1 |
| COMPARATIVE SAMPLE 1 | HEAT RESISTANT ADHESIVE: $Al_2O_3$ SERIES | — | — | 1000 |
| COMPARATIVE SAMPLE 2 | CRYSTAL GLASS: $Al_2O_3$—$SiO_3$—$Bi_2O_3$ SERIES | — | — | 500 |

In Table 1, "—" in $Al_2O_3$—$ZrO_2$, means that $Al_2O_3$ and $ZrO_2$ form composite particles. In Table 1, "+" in $Al_2O_3$ + $YCrMnO_3$ + $Y_2O_3$, means that $Al_2O_3$ particles, $YCrMnO_3$ particles, and $Y_2O_3$ particles are mixed.

With respect to the test samples 1 to 30, it is considered that since the platinum component was dispersed in the oxide composing the coating material 5, the test gas containing the reducing gas hardly contacted the temperature sensing element 3, and therefore, the resistance change rate hardly changed. It is presumed that the same results can be obtained also in the case of containing platinum alloy or platinum-containing oxide that is not contained in test samples 1 to 30. On the other hand, with respect to the comparative samples 1 and 2, it is considered that since the platinum component was not dispersed in the oxide composing the coating material, the test gas containing the reducing gas contacted with the temperature sensing element 3, and therefore, the resistance change rate changed greatly.

According to the confirmation test described above, it has been found that the reduction resistance is improved by the coating material in which the platinum component is dispersed in the oxide, and the durability of the temperature sensor 1 against the measurement target gas G is maintained high.

The present disclosure is not limited to the present embodiment, but may be configured by different embodiments within the scope not deviating from the gist of the present disclosure. The present disclosure includes various modifications and modifications within the equivalent scope.

What is claimed is:

1. A temperature sensor comprising:
a metal tube having an opening as an opening tip portion at a tip of the metal tube;
a temperature sensing element disposed at the opening tip portion for measuring a temperature of measurement target gas in measurement environment;
a pair of lead wires disposed in the metal tube, each including a lead tip portion containing at least one of platinum and platinum alloy and contacting a surface of the temperature sensing element;
an insulating support material disposed in the metal tube and made of ceramic for insulating the pair of lead wires from the metal tube and supporting the pair of lead wires in the metal tube; and
a coating material disposed at the opening tip portion in a state of covering the temperature sensing element, the lead tip portion, and a tip surface of the insulating support material, the coating material having a property of not allowing measurement target gas to pass through, wherein the coating material contains oxide and at least one of platinum, platinum alloy, and platinum-containing oxide containing platinum that are dispersed in the oxide; and
no portion of the metal tube is positioned on a tip side of a tip end portion of the temperature sensing element in an axial direction of the metal tube.

2. The temperature sensor according to claim 1, wherein the coating material is disposed at an outermost peripheral portion of a detecting tip portion of the temperature sensor, with which measurement target gas is in contact.

3. The temperature sensor according to claim 1, wherein at least one of platinum and platinum alloy that are contained in the lead tip portion and at least one kind of platinum, platinum alloy, and platinum-containing oxide that are contained in the coating material are bonded via oxygen of oxide contained in the coating material.

4. The temperature sensor according to claim 1, wherein a content of platinum contained in at least one of platinum, platinum alloy, and platinum-containing oxide in the coating material is in a range of 0.001 to 30 mass %.

5. The temperature sensor according to claim 1, wherein the oxide contains $Al_2O_3$ and contains at least one of $ZrO_2$, $SiO_2$, $Y_2O_3$, $Al_2O_3$—$SiO_2$, and $ZrSiO_4$ as an optional component.

6. The temperature sensor according to claim 1, wherein the oxide contains a composition that composes the temperature sensing element.

7. The temperature sensor according to claim 6, wherein the composition is composite oxide that contains $YCrMnO_3$ and $Y_2O_3$.

8. The temperature sensor according to claim 1, wherein the platinum alloy composing the coating material is at least one of Pt—Rh, Pt—Pd, Pt—Ir, Pt—Ru, Pt—Os, Pt—Ni, Pt—W, Pt—Nb, Pt—Ta, Pt—Hf, Pt—Ti, Pt—Au, Pt—Mo, Pt—Co, and Pt—Ir—Ti, and wherein the platinum-containing oxide composing the coating material is at least one of Pt—$ZrO_2$ and Pt—Rh—$ZrO_2$.

9. The temperature sensor according to claim 1, wherein platinum alloy composing the lead tip portion is alloy of platinum and at least one of Ru, Rh, Pd, Os, and Ir.

10. The temperature sensor according to claim 1, wherein a part of the temperature sensing element is disposed on a tip side relative to the opening tip portion in an axial direction of the metal tube, and another part of the temperature sensing element is disposed on a base end side relative to the opening tip portion in the axial direction of the metal tube.

11. The temperature sensor according to claim 1, wherein an entirety of the temperature sensing element is disposed on a tip side relative to the opening tip portion in an axial direction of the metal tube.

12. The temperature sensor according to claim 1, wherein the insulating support material is in contact with an inner periphery of a portion of the metal tube.

* * * * *